United States Patent
Ying et al.

(10) Patent No.: US 11,336,580 B2
(45) Date of Patent: May 17, 2022

(54) METHODS, APPARATUSES AND COMPUTER PROGRAM PRODUCTS FOR TRANSMITTING DATA

(71) Applicant: EMC IP Holding Company LLC, Hopkinton, MA (US)

(72) Inventors: Zhi Ying, Shanghai (CN); Junping Zhao, Beijing (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 140 days.

(21) Appl. No.: 16/379,308

(22) Filed: Apr. 9, 2019

(65) Prior Publication Data

US 2019/0327175 A1   Oct. 24, 2019

(30) Foreign Application Priority Data

Apr. 20, 2018 (CN) .......................... 201810361467.7

(51) Int. Cl.
| | | |
|---|---|---|
| H04L 47/24 | (2022.01) | |
| H04L 47/193 | (2022.01) | |
| H04L 45/50 | (2022.01) | |
| H04L 45/125 | (2022.01) | |
| H04L 47/70 | (2022.01) | |

(52) U.S. Cl.
CPC ............ *H04L 47/24* (2013.01); *H04L 45/125* (2013.01); *H04L 45/507* (2013.01); *H04L 47/193* (2013.01); *H04L 47/825* (2013.01)

(58) Field of Classification Search
CPC ......... H04L 45/02; H04L 45/04; H04L 45/30; H04L 45/125; H04L 45/507; H04L 47/24; H04L 47/193; H04L 47/825

See application file for complete search history.

(56) References Cited

U.S. PATENT DOCUMENTS

| 10,027,594 B1* | 7/2018 | Seshadri ............... H04L 45/745 |
|---|---|---|
| 2002/0196808 A1* | 12/2002 | Karri .................. H04Q 11/0478 |
| | | 370/468 |
| 2009/0144443 A1* | 6/2009 | Vasseur .................. H04L 45/02 |
| | | 709/238 |

(Continued)

FOREIGN PATENT DOCUMENTS

| CN | 104380667 A | 2/2015 |
|---|---|---|
| CN | 104954261 A | 9/2015 |

*Primary Examiner* — Melanie Jagannathan
(74) *Attorney, Agent, or Firm* — Ryan, Mason & Lewis, LLP (57) ABSTRACT

Embodiments of the present disclosure provide methods, apparatuses and computer program products for transmitting data. A method comprises determining, at a source node, a traffic type of a packet to be sent to a destination node, the source node and the destination node having therebetween a plurality of network paths for different traffic types. The method further comprises including a mark indicating the traffic type in the packet. In addition, the method further comprises sending the packet including the mark to the destination node such that the packet is forwarded along one of the plurality of network paths specific to the traffic type. Embodiments of the present disclosure can transmit data using different network paths based on different traffic types of data so as to optimize network performance for different network requirements.

20 Claims, 7 Drawing Sheets

(56) References Cited

U.S. PATENT DOCUMENTS

| | | | |
|---|---|---|---|
| 2009/0190477 A1* | 7/2009 | Osborne | H04L 45/50 370/237 |
| 2010/0226252 A1* | 9/2010 | Gogic | H04L 47/12 370/236 |
| 2013/0250955 A1* | 9/2013 | Wang | H04L 45/54 370/392 |
| 2013/0336126 A1* | 12/2013 | Vasseur | H04L 41/0896 370/236 |
| 2014/0314401 A1* | 10/2014 | Fujimori | H04L 43/0852 398/5 |
| 2015/0172186 A1* | 6/2015 | Kizu | H04L 45/34 370/392 |
| 2015/0236900 A1* | 8/2015 | Chung | H04L 41/082 709/221 |
| 2016/0094670 A1* | 3/2016 | Garcia Manchado | H04L 67/22 709/217 |
| 2017/0149625 A1* | 5/2017 | Chitti | H04L 41/5003 |

* cited by examiner

METHODS, APPARATUSES AND COMPUTER PROGRAM PRODUCTS FOR TRANSMITTING DATA

RELATED APPLICATION(S)

The present application claims priority to Chinese Patent Application No. 201810361467.7, filed Apr. 20, 2018, and entitled "Methods, Apparatuses and Computer Program Products for Transmitting Data," which is incorporated by reference herein in its entirety.

FIELD

Embodiments of the present disclosure generally relate to the field of data transmission, and more specifically, to methods, apparatuses and computer program products for transmitting data.

BACKGROUND

Conventional selection of network paths is usually based on a network destination address or traffic information of a transport layer. The network path is usually determined based on a routing protocol, such as the shortest routing algorithm or the equal-cost multi-path (ECMP) routing algorithm. For example, the selection of network paths generally depends on a network address, a source port or a destination port, or other static configuration fields in a data packet. Therefore, in the conventional scheme, all the data transmitted from the same source node to the same destination node are transmitted via the same network path.

With increasing computing demands, many communication-intensive applications, such as machine learning, deep learning and data mining, run on clustered infrastructure. Data traffic generated by these applications generally has different functions, and thus has different requirements for network paths. For example, some data may require network paths with greater bandwidth, while other data may require network paths with lower latency. However, it is difficult for the conventional network path selection scheme to adapt well to the different requirements of these applications for the network path.

SUMMARY

Embodiments of the present disclosure provide methods, apparatuses and computer program products for transmitting data.

In a first aspect of the present disclosure, there is provided a method for transmitting data. The method comprises determining, at a source node, a traffic type of a packet to be sent to a destination node, the source node and the destination node having therebetween a plurality of network paths for different traffic types. The method further comprises including a mark indicating the traffic type in the packet. In addition, the method further comprises sending the packet including the mark to the destination node such that the packet is forwarded along one of the plurality of network paths specific to the traffic type.

In a second aspect of the present disclosure, there is provided a method implemented at a network node. The method comprises, in response to receiving, from a source node, a packet to be sent to a destination node, obtaining from the packet a mark indicating a traffic type of the packet. The method further comprises obtaining a plurality of network paths for different traffic types between the source node and the destination node. The method further comprises selecting, based on the mark, a network path specific to the traffic type from the plurality of network paths. In addition, the method further comprises forwarding the packet according to the selected network path.

In a third aspect of the present disclosure, there is provided an apparatus for transmitting data. The apparatus comprises at least one processing unit and at least one memory coupled to the at least one processing unit and storing instructions executed by the at least one processing unit, the instructions, when executed by the at least one processing unit, causing the apparatus to perform acts comprising: determining a traffic type of a packet to be sent to a destination node, the apparatus and the destination node having therebetween a plurality of network paths for different traffic types; including a mark indicating the traffic type in the packet; and sending the packet including the mark to the destination node such that the packet is forwarded along one of the plurality of network paths specific to the traffic type.

In a fourth aspect of the present disclosure, there is provided a network node. The network node comprises at least one processing unit and at least one memory coupled to the at least one processing unit and storing instructions executed by the at least one processing unit, the instructions, when executed by the at least one processing unit, causing the network node to perform acts comprising: in response to receiving, from a source node, a packet to be sent to a destination node, obtaining from the packet a mark indicating a traffic type of the packet, obtaining a plurality of network paths for different traffic types between the source node and the destination node; selecting, based on the mark, a network path specific to the traffic type from the plurality of network paths; and forwarding the packet according to the selected network path.

In a fifth aspect of the present disclosure, there is provided a computer program product being tangibly stored on a non-transitory computer readable medium and comprising machine executable instructions which, when executed by a device, cause the device to perform any step of the method according to the first aspect of the present disclosure.

In a sixth aspect of the present disclosure, there is provided a computer program product being tangibly stored on a non-transitory computer readable medium and comprising machine executable instructions which, when executed by a device, cause the device to perform any step of the method according to the second aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following Detailed Description with reference to the accompanying drawings, the above and other objectives, features, and advantages of example embodiments of the present disclosure will become more apparent. In example embodiments of the present disclosure, the same reference numerals usually represent the same components.

Throughout the drawings, the same or corresponding reference numerals refer to the same or corresponding parts.

DETAILED DESCRIPTION

Preferred embodiments of the present disclosure will be described in the following in greater detail with reference to the drawings. Although preferred embodiments of the present disclosure are shown in the drawings, it is to be understood that the present disclosure can be implemented in various manners and is not limited to the embodiments illustrated herein. Rather, these embodiments are provided to make the present disclosure thorough and complete, and convey the scope of the present disclosure fully to those skilled in the art.

As used herein, the term "include" and its variants are to be read as open-ended terms that mean "include, but is not limited to." The term "or" is to be read as "and/or" unless the context clearly indicates otherwise. The term "based on" is to be read as "based at least in part on." The terms "an example embodiment" and "an embodiment" are to be read as "at least one example embodiment." The term "another embodiment" is to be read as "at least another embodiment." The terms "first," "second" and the like may refer to different or identical objects. Other definitions, explicit and implicit, may be included below.

Figure 1:
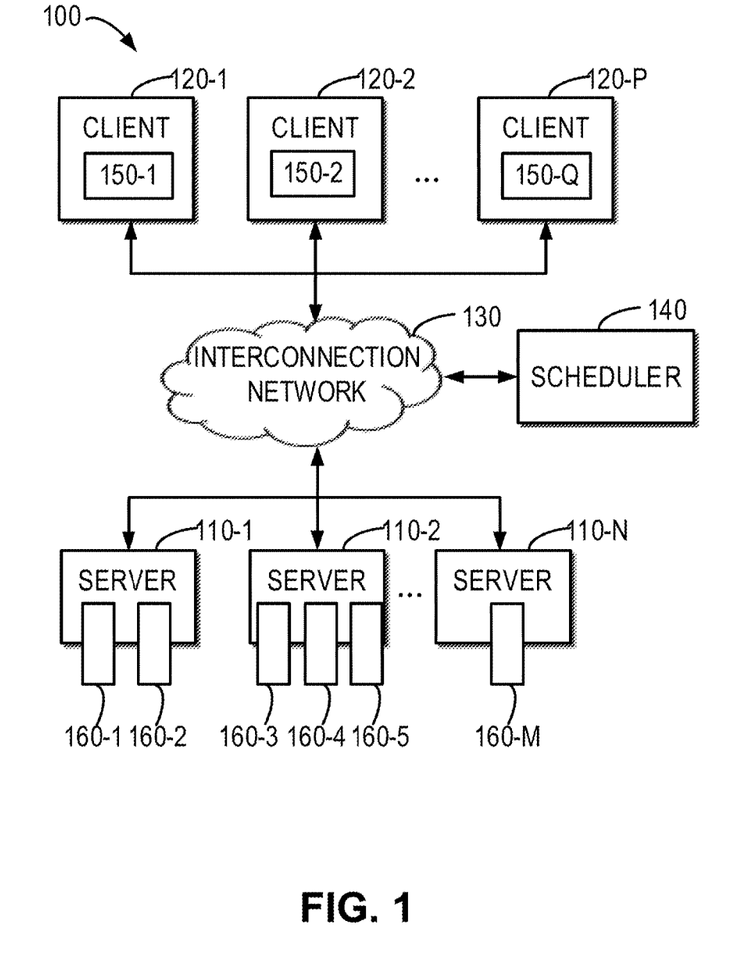
FIG. 1 is a schematic block diagram illustrating an environment in which some embodiments of the present disclosure may be implemented.

FIG. 1 is a schematic diagram illustrating an example environment 100 in which embodiments of the present disclosure may be implemented. It is to be understood that the structure and function of the example environment 100 are described only out of purpose of illustration, rather than to suggest any limit to the scope of the present disclosure. Embodiments of the present disclosure may also be applied to an environment having a different structure and/or function.

The environment 100 shows an example system architecture of a Graphic Processing Unit (GPU) as a Service (GPUaaS). In particular, as shown in FIG. 1, a plurality of servers 110-1, 110-2 . . . 110-N (individually or collectively referred to as server 110, where N is a natural number) for providing GPU resources to the application are deployed in the environment 100. The server 110 may be a physical or virtual machine. For example, the server 110 may be logic, a container or a virtual machine deployed in the data center or the private or public cloud, or a physical server or a computing device and so on. A plurality of physical GPUs 160-1, 160-2 . . . 160-M (individually or collectively referred to as pGPU 160, where M is a natural number) may be distributed on a plurality of servers 110.

As shown in FIG. 1, a plurality of clients 120-1, 120-2 . . . 120-P (individually or collectively referred to as client 120, where P is a natural number) are further deployed in the environment 100, and have respective running applications 150-1, 150-2 . . . 150-Q (individually or collectively referred to as application 150, where Q is a natural number). The application 150 may be any application operable on a machine and can be designed to implement corresponding data processing or analysis tasks. As an example, the application 150 may perform data processing or analysis tasks related to high performance computing (HPC), machine learning (ML) or deep learning (DL) and artificial intelligence (AI)), and the like.

In order to run these applications quickly and efficiently, the client 120 may request to use the GPU resources in the server 110 to run the application 150. As shown in FIG. 1, the client 120, the server 110 and a scheduler 140 may be interconnected via an interconnection network 130 which may enable different types of wired or wireless connections based on various network transmission technologies, such as remote direct memory access (RDMA) and transmission control protocol (TCP). The scheduler 140 may be configured to divide the plurality of pGPUs 160 into logical GPUs (also referred to as "virtual GPU," vGPU) and allocate GPU resources in vGPUs to the application 150. The "vGPU" described herein refers to a logical representation of finer-grain dividing of the pGPU.

By allocating the respective vGPUs formed by dividing the pGPU 160 to the application 150, the application 150 may be accelerated using vGPUs as using normal GPUs. For example, the application 150 may operate GPU resources corresponding to the allocated vGPUs of the server 110 by calling a specific application program interface (API). Examples of such an API include but are not limited to, e.g., the compute unified device architecture (CUDA) API presented by the graphics card vendor NVIDIA. The calling of such API by the application 150 will cause the respective data to be sent from the client 120 where the application 150 is located to the respective server 110 (such as the server where the pGPUs corresponding to the vPGUs allocated to the application 150 are located), for example, via the network 130.

As described above, in the conventional scheme, the network path in the network 130 for transmitting data from the client 120 to the server 110 is generally determined based on a routing protocol. Such a routing protocol includes, for example, the shortest routing selection algorithm or the ECMP protocol. Therefore, although multiple paths with different network characteristics (such as different network latencies and/or different bandwidths) may exist between the client 120 and the server 110 in the network 130, but in the conventional scheme, all the data sent from the client 120 to the server 110 will be transmitted via the same network path.

However, network data traffic between the client 120 and the server 110 generated by the application 150 may have different functions and thus impose different requirements for network paths. For example, some data (also referred to as "bandwidth sensitive" data) may require a network path with a larger bandwidth, while some data (also referred to as "latency sensitive" data) may require a network path with a lower latency. Apparently, the conventional network path selection scheme can hardly meet different requirements of network paths for different data.

Example embodiments of the present disclosure provide a scheme for transmitting data over a network. In this scheme, data is transmitted using different network paths based on different traffic types of data so as to optimize network performance for different network requirements.

In the following description, reference will be made to the GPUaaS environment 100 shown in FIG. 1 to describe various example embodiments of the present disclosure. However, it is to be understood that this is only for purpose of illustration, rather than to limit the scope of the present disclosure. The spirit and principles described herein may also be applied to any other scenario and/or environment for transmitting data from one node (also referred to as "source node") to another node (also referred to as "target node") via the network.

Figure 2:
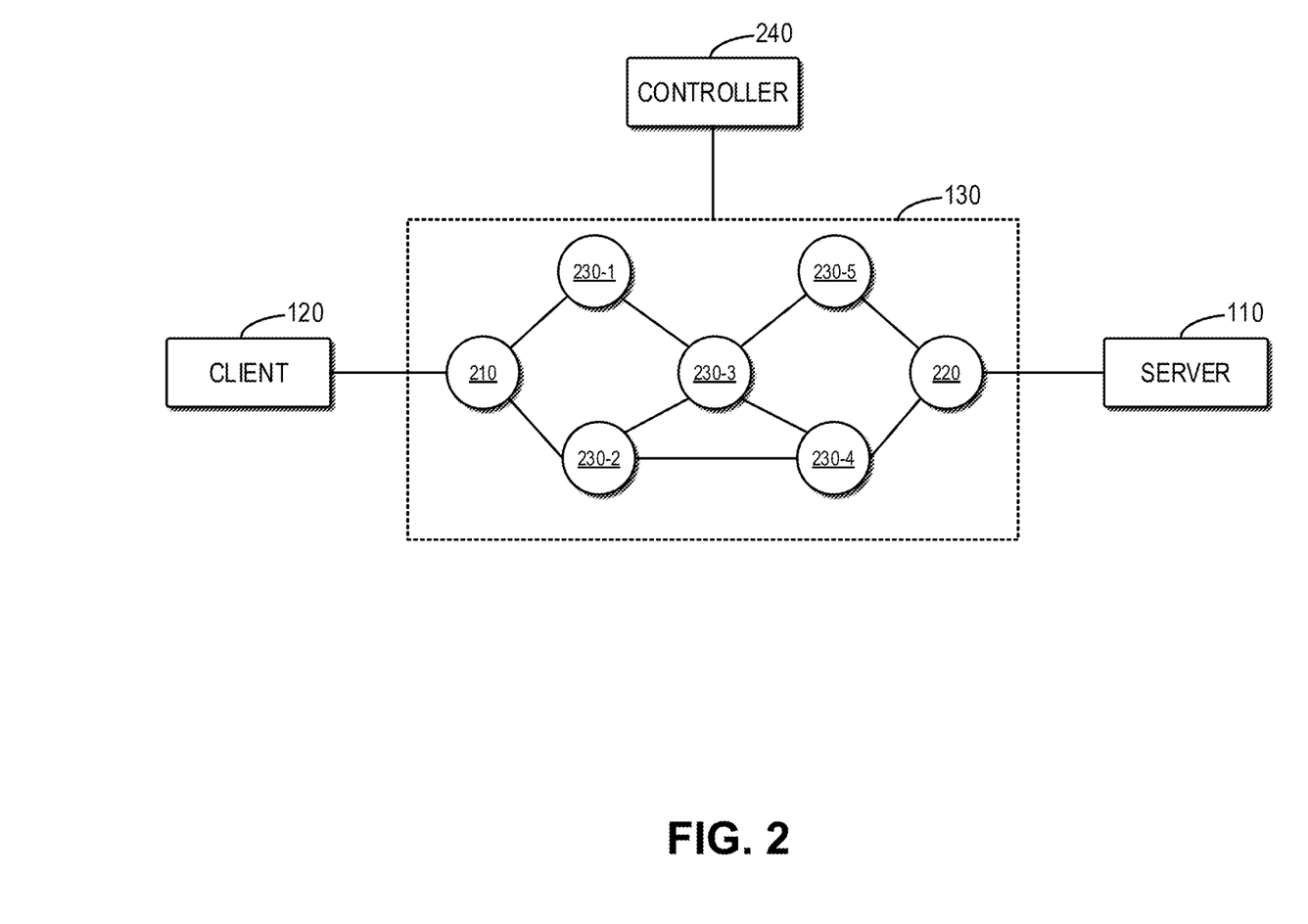
FIG. 2 is a block diagram illustrating an example network in accordance with embodiments of the present disclosure.

FIG. 2 is a block diagram illustrating an example network 130 in accordance with embodiments of the present disclosure. It is to be understood that the structure and function of the example network 130 are described only for purpose of illustration, rather than to suggest any limit to the scope of the present disclosure.

As shown in FIG. 2, the network 130 may include a plurality of network nodes, such as an edge node 210 communicatively connected with the client 120, an edge node 220 communicatively connected with the server 110, and one or more center nodes 230-1, 230-2 . . . 230-5 (individually or collectively referred to as center node 230). The "edge node" described here refers to the network node closest to the user, while the "center node" refers to the network node remote from the client and located between the edge nodes. Examples of the edge and center nodes may include, but are not limited to, a network device such as a router capable of packet forwarding.

The plurality of network nodes in the network 130 may be connected with each other communicatively so as to form a plurality of network paths from the client 120 to the server 110. The plurality of network paths may have different network characteristics, such as different latencies or bandwidths. As shown in FIG. 2, it is assumed here that there are two network paths between the client 120 and the server 110: one starting from the edge node 210, passing sequentially through the center nodes 230-1, 230-3 and 230-5, and reaching the edge node 220 (hereinafter also referred to as "first network path"); the other starting from the edge node 210, passing sequentially through the center nodes 230-2 and 230-4, and reaching the edge node 220 (hereinafter also referred to as "second network path"). The first network path has four hops, and for example, it is assumed that each hop has a latency of 10 milliseconds (ms) and a bandwidth of 100 Gigabits per second (Gbps). Therefore, the first network path has a latency of 40 ms and a bandwidth of 100 Gbps. The second network path has three hops, and for example, it is assumed that each hop has a latency of 10 ms and a bandwidth of 10 Gbps. Therefore, the second network path has a latency of 30 ms and a bandwidth of 10 Gbps.

The plurality of network paths described above may be generated by the controller 240 shown in FIG. 2 and indicated to the corresponding edge nodes. For example, the controller 240 may be configured to communicate with each network node of the network 130 so as to monitor the network condition of network 130, and thus determine the plurality of network paths from the client 120 to the server 110, thereby meeting different requirements of network paths for different types of data traffic. The controller 240 may include the plurality of determined network paths in a look-up table of network paths and provide part of or all of the look-up table of network paths to the respective edge nodes (in this example, the edge node 210).

Figure 3:
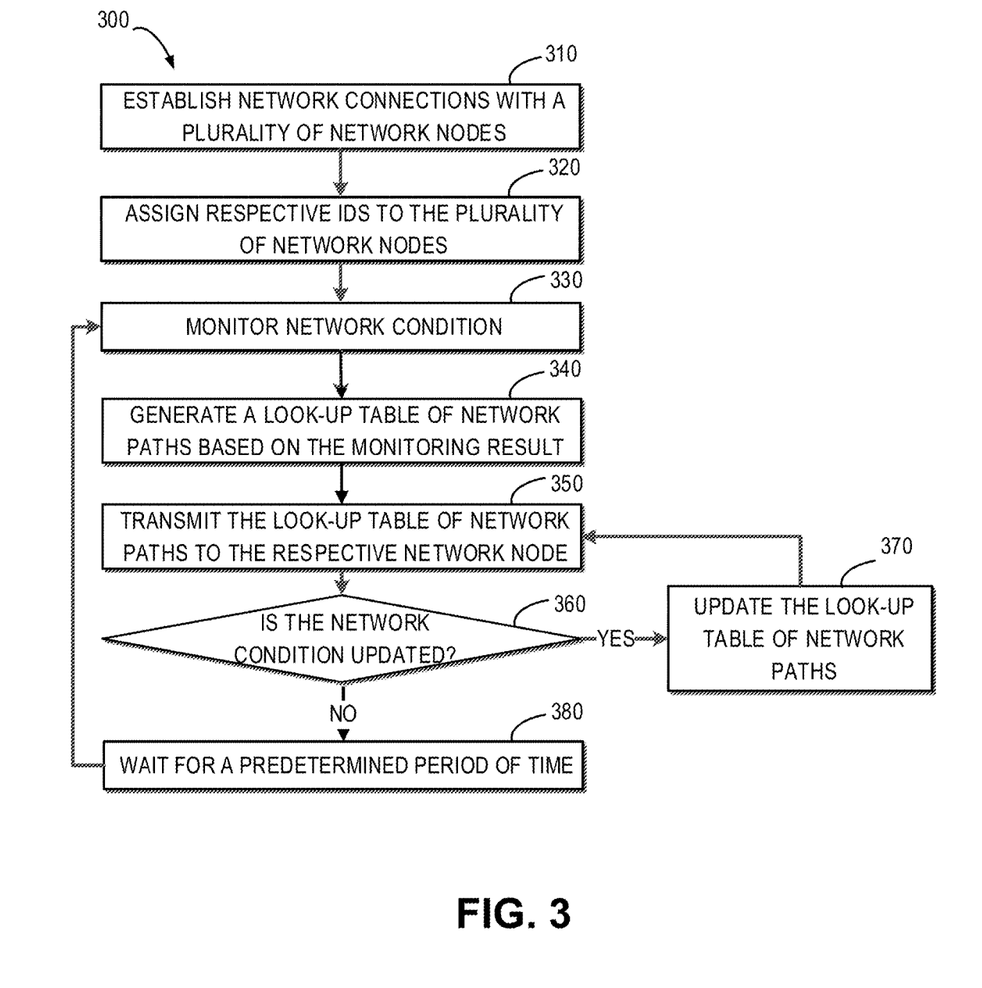
FIG. 3 is a flowchart illustrating an example process for generating a look-up table of network paths in accordance with embodiments of the present disclosure.

FIG. 3 is a flowchart illustrating a process 300 for generating a look-up table of network paths in accordance with embodiments of the present disclosure. For example, the process 300 may be performed by the controller 240 shown in FIG. 2. It is to be understood that the process 300 may further include additional acts not shown and/or omit the acts shown, and the scope of present disclosure is not limited in this regard.

At block 310, connections between the controller 240 and the plurality of network nodes 210, 220 and 230 managed by the controller 240 are established. At block 320, the controller 240 may assign a unique identifier (ID) to each network node of the plurality of network nodes 210, 220 and 230 managed by the controller 240. In the following description, the ID assigned for the network node is also referred to as a "label." Then, at block 330, the controller 240 may monitor the network condition of the network 130. In some embodiments, the controller 240 may monitor the network condition of the network 130 based on the existing telemetering technologies. For example, the controller 240 may monitor characteristics of interfaces of different network nodes and characteristics of links between network nodes to determine the bandwidth at different network nodes and the latency between network nodes.

At block 340, the controller 240 may generate a look-up table of network paths including a plurality of network paths based on the monitoring result, where each network path is represented by a label list consisting of IDs of the network nodes that it traverses. For example, Table 1 shows an example of a look-up table of network paths established by the controller 240.

TABLE 1

| An example look-up table of network paths | | | |
|---|---|---|---|
| Source edge node | Destination edge node | Traffic type for the path | Label list representing the path |
| 210 | 220 | Type 1 | 230-1→230-3→230-5 |
| 210 | 220 | Type 2 | 230-2→230-4 |

As shown in Table 1, for the same source edge node 210 and destination edge node 220, the controller 240 may generate a plurality of network paths with different network characteristics for different types of traffic. For example, the first network path passing sequentially through the center nodes 230-1, 230-3 and 230-5 has a latency of 40 ms and a bandwidth of 100 Gbps, and thus may be applied to the bandwidth sensitive network traffic (such as "type 1" in Table 1); while the second network path passing sequentially the center nodes 230-2 and 230-4 has a latency of 30 ms and a bandwidth of 10 Gbps, and thus may be applied to the latency sensitive (for example, "type 2" in Table 1) network traffic.

At block 350, the controller 240 may send the generated look-up table of network paths to the respective network nodes. In some embodiments, the controller 240 may send the generated network list to a part of or all of the nodes in the network 130. In particular, in some embodiments, the controller 240 may transmit a part of the generated network list to the edge and/or center nodes associated with the part. For example, in this example, the controller 240 may send the look-up table of network paths shown in Table 1 to the source edge node 210. Based on the received look-up table of network paths, the source edge node 210 may forward data for a particular traffic type according to the network path specific for this traffic type as indicated by the look-up table of network paths. The operations at the edge node 210 will be further described below in detail in combination with the drawings.

At block 360, the controller 240 may further determine if the network condition is updated. When the network condition is updated, at block 370, the controller 240 may update the look-up table of network paths accordingly based on the update of the network condition. Then, the process 300 may proceed to block 350, where the controller 240 sends the updated look-up table of network paths to the respective network nodes. When the controller 240 determines at block 360 that the network condition is not updated, at block 380, the controller 240 may wait for a predetermined period of time and then the process 300 returns to block 330 to perform the next round of the monitoring of the network condition and the generation of the look-up table of network paths.

The description above illustrates an example process of monitoring network condition and generating different network paths for different traffic types in accordance with embodiments of the present disclosure. The following description will further describe how to apply different network paths for different traffic types in combination with the drawings.

Figure 4:
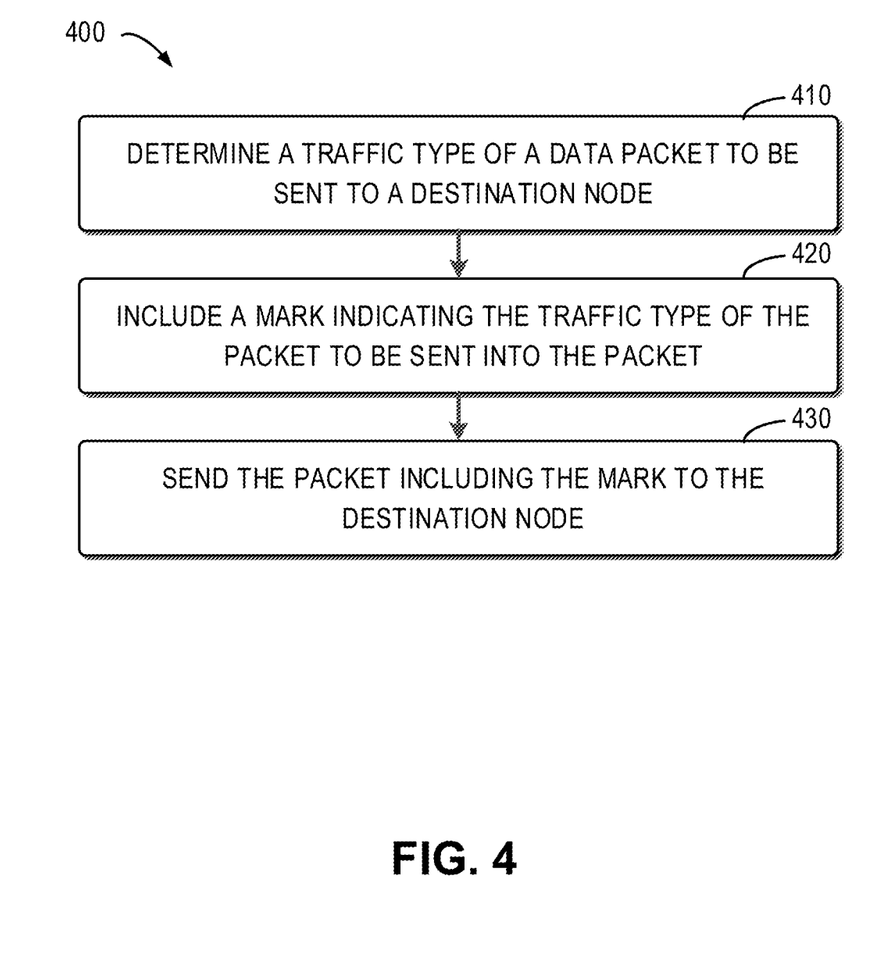
FIG. 4 is a flowchart illustrating an example process for transmitting data in accordance with embodiments of the present disclosure.

FIG. 4 is a flowchart illustrating a process 400 for transmitting data in accordance with embodiments of the present disclosure. For example, the process 400 may be performed by the client 120 (also referred to as "source node" herein) shown in FIG. 2. It is to be understood that the process 400 may further include additional acts not shown and/or omit the acts shown and the scope of present disclosure is not limited in this regard.

At block 410, the client 120 determines the traffic type of a data packet to be transmitted to the server 110 (also referred to as "destination node" herein). As described above in combination with FIG. 1, the application 150 on the client 120 may operate GPU resources of the server 110 by calling a particular API. The calling of such an API by the application 150 will cause the related data packet to be sent from the client 120 where the application 150 is located to the respective server 110. In some embodiments, the client 120 may determine the traffic type of a packet based on the API that generates the data packet. For example, it is assumed that the API called by the application 150 for operating the GPU resources is CUDA API, and the function specifically called is cudaMemcpy( ) for duplicating data between the client memory and the GPU memory. Such calling of API generally causes the transmission of a large amount of data and thus requires a larger network bandwidth. In this case, the client 120 may determine that the generated data packet is bandwidth sensitive. In another example, it is assumed that the API called by the application 150 for operating the GPU resources is CUDA API, and the function specifically called is cudaGetDevice( ) for querying information about the respective GPU. Compared with cudaMemcpy( ) in the previous example, such calling of API has a lower demand for network bandwidth but may require the network latency to be as short as possible. Therefore, the client 120 may determine based on this calling that the generated data packet is latency sensitive. In some other embodiments, the client 120 may also determine the traffic type of a packet to be sent based on user information associated with the packet. For example, it is possible to specify different traffic types for different users so as to provide differentiated network services to them. In addition, the client 120 may also determine the traffic type of a data packet to be sent in other ways in addition to those described above.

At block 420, the client 120 may include a mark indicating the traffic type of the packet to be sent in the packet. In some embodiments, for example, the client 120 may include the mark indicating the traffic type at any of a service type field in an Internet protocol (IP) header of the packet or a transmission control protocol (TCP) option field in a TCP header of the packet. In other embodiments, the client 120 may also use other fields or other approaches to include the mark of the traffic type in the packet. In some embodiments, when the traffic type of the packet is determined based on the user, the mark may indicate user information associated with the packet.

At block 430, the client 120 may send the packet containing the mark to the server 110 (namely, the destination node). For example, the client 120 may deliver the packet to the edge node 210 communicatively connected to the client 120 as shown in FIG. 2 to transmit the packet to the server 110 through the network path specific to the traffic type of the packet.

Figure 5:
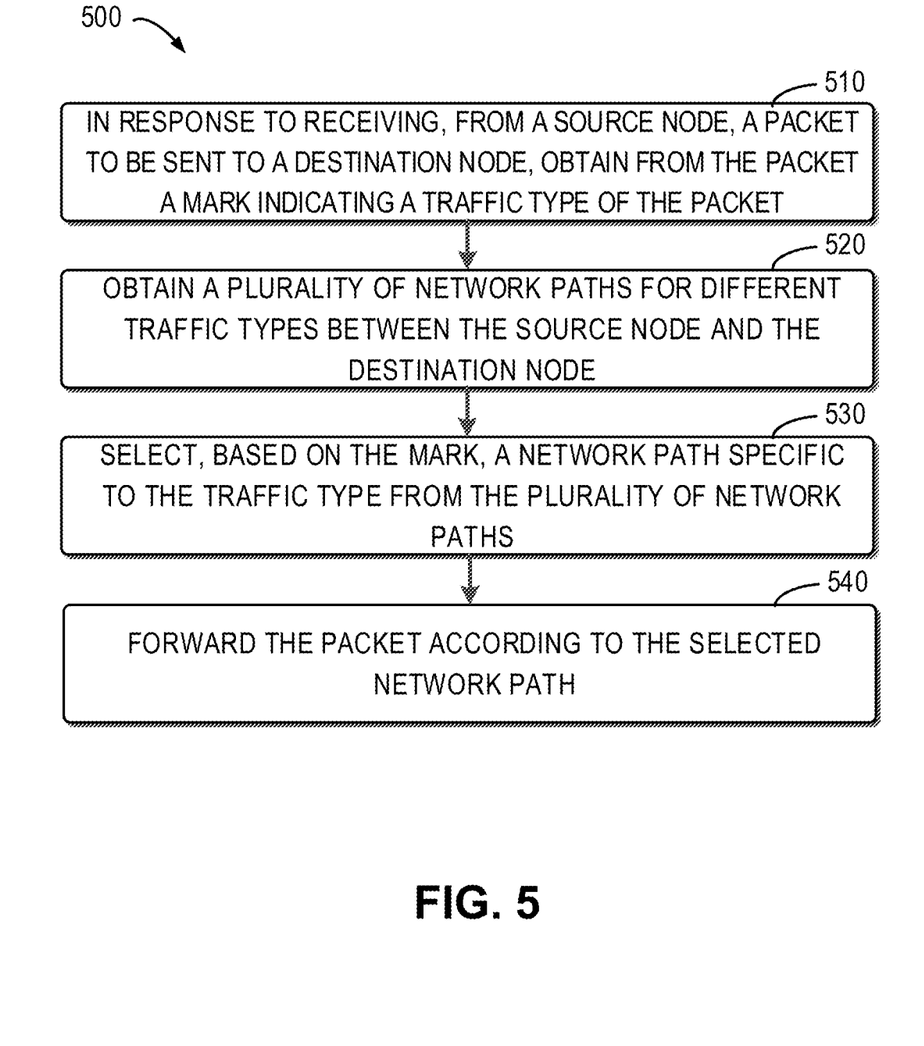
FIG. 5 is a flowchart illustrating an example process for transmitting data in accordance with embodiments of the present disclosure.

FIG. 5 is a flowchart illustrating a process 500 performed at an edge node in accordance with embodiments of the present disclosure. For example, the process 500 may also be performed by the edge node 210 shown in FIG. 2. It is to be understood that the process 500 may also include additional acts not shown and/or omit the acts shown and the scope of the present disclosure is not limited in this regard.

At block 510, in response to receiving, from the client 120, the packet to be sent to the server 110, the edge node 210 may obtain a mark indicating the traffic type of the packet from the packet. In some embodiments, the edge node 210 may obtain the mark indicating the traffic type of the packet from, for example, any of the service type field in the IP header of the packet or the TCP option field in the TCP header of the packet. When the client 120 uses other fields or other approaches to include the mark indicating the traffic type in the packet, the edge node 210 may also obtain the mark indicating the traffic type of the packet from the corresponding fields or based on the corresponding approaches. In some embodiments, the traffic type of the packet may be bandwidth sensitive or latency sensitive.

At block 520, the edge node 210 may obtain a plurality of network paths for different traffic types between the client 120 and the server 110. As described previously in combination with FIG. 3, in some embodiments, the edge node 210 may periodically obtain the look-up table of network paths indicating the plurality of network paths from the controller 240 shown in FIG. 2. In some other embodiments, in response to obtaining the mark indicating the traffic type from the packet, the edge node 210 may also proactively obtain a look-up table of network paths indicating a plurality of network paths from the controller 240. The look-up table of network paths obtained by the edge node 210 is for example, shown in Table 1, which may indicate that there are two network paths between the client 120 and the server 110, where the first network path for type 1 (namely, "bandwidth sensitive") data starts from the edge node 210, passes sequentially through the center nodes 230-1, 230-3 and 230-5 and reaches the edge node 220, and the second network path for type 2 (namely, "latency sensitive") data starts from the edge node 210, and passes sequentially through the center nodes 230-2 and 230-4 and reaches the edge node 220. The first network path may be represented by the sequence "230-1→230-3→230-5" of the labels corresponding to the center nodes that it traverses, and the second network path may be represented by the sequence "230-2→230-4" of the labels corresponding to the center nodes that it traverses.

At block 530, the edge node 210 may select from the plurality of network paths a network path specific to the traffic type of the packet based on the obtained mark of the packet. It is assumed here that the mark of the packet obtained by the edge node 210 indicates that the traffic type of the packet is latency sensitive. In this case, the edge node 210 may select the second network path as the network path for forwarding the packet.

At block 540, the edge node 210 may forward the packet based on the selected network path. In some embodiments, the edge node 210 may use the sequence of labels representing the selected network path to replace the mark indicating the traffic type of the packet. For example, in the above example, the edge node 210 may use the sequence of labels "230-2→230-4" to replace the mark indicating the traffic type in the packet. Then, the edge node 210 may determine, based on the sequence of labels, the next network node (such as the center node 230-2) to which the packet is forwarded. The edge node 210 then forwards the modified packet to the center node 230-2.

In some embodiments, the forwarding of packets between center nodes (such as the center nodes 230-2 and 230-4) may be performed based on the multi-protocol label switching (MPLS) technology. For example, at the center node 230-2, the center node 230-2 may find a label identifying itself from the packet and remove the label from the packet. Then, the center node 230-2 may find a label identifying the next network node, such as the center node 230-4, and forward the packet to the next network node 230-4. The operation at the center node 230-4 is similar to that at the center node 230-2. For example, the center node 230-4 may find a label identifying itself from the packet and remove the label from the packet. Then, as there is not any other label identifying a center node, the center node 230-4 may forward the packet to the edge node 220 communicatively connected to the center node 230-4. The edge node 220 may transfer the packet to the server 110 based on the destination address of the packet.

Figure 6:
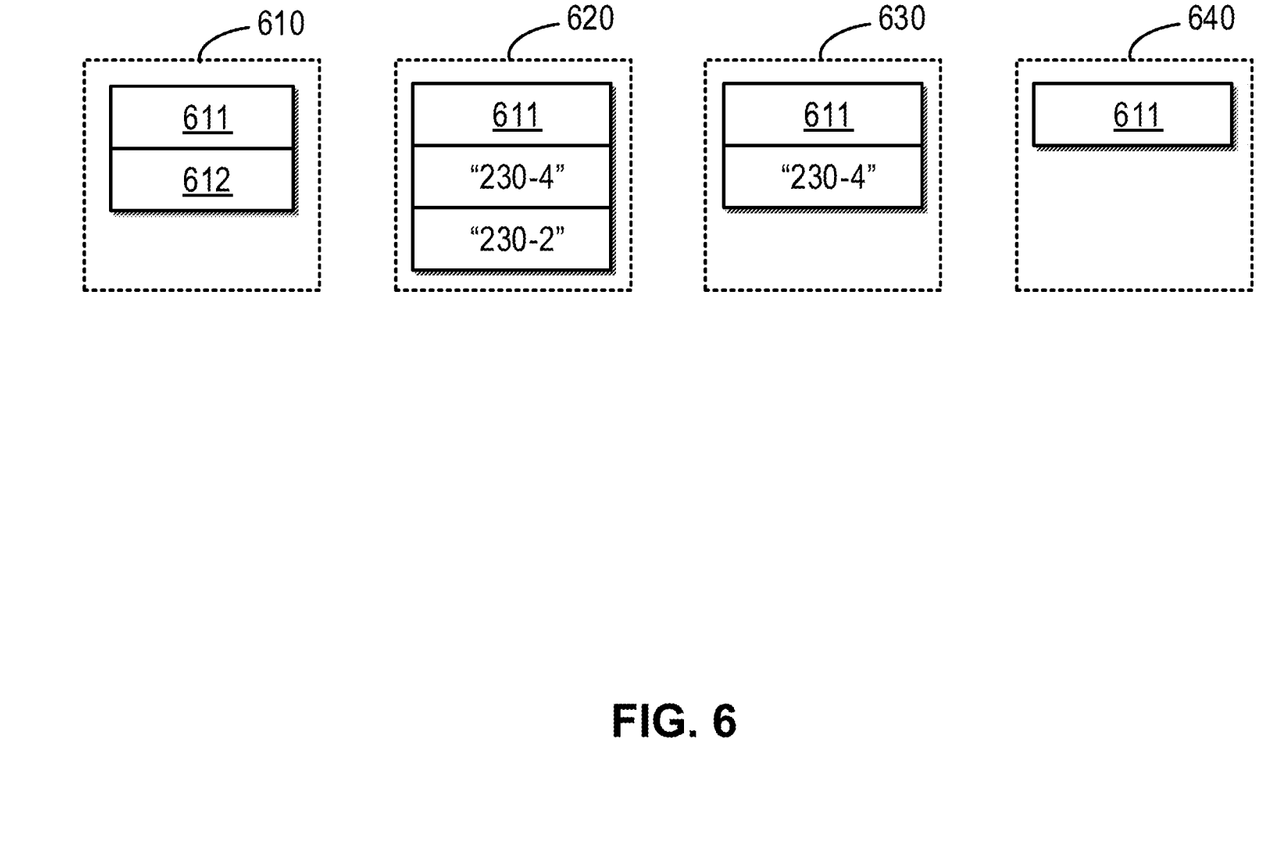
FIG. 6 is a schematic diagram illustrating a packet forwarded along a network path specific to a traffic type in accordance with embodiments of the present disclosure.

FIG. 6 is a schematic diagram illustrating a packet forwarded along a network path specific to a traffic type in accordance with embodiments of the present disclosure. As shown in FIG. 6, the packet 610, for example, may include an example packet sent from the client 120 to the edge node 210. The packet 610 may include a load 611 and a mark 612 indicating the traffic type of the packet 610, for example, "latency sensitive". It is to be understood that the packet 610 may also include other portions or fields which are, however, omitted in FIG. 6 for ease of illustration. The packet 620, for example, may represent the packet forwarded from the edge node 210 to the center node 230-2. The packet 620 includes the load 611 and a sequence of labels "230-2→230-4" that replaces the mark 612. The packet 630, for example, may represent the packet forwarded from the center node 230-2 to the center node 230-4. As shown in FIG. 6, the packet 630 includes the load 611 and the label "230-2" is removed from the sequence of labels "230-2→230-4". The packet 640, for example, may represent the packet forwarded from the center node 230-4 to the edge node 220. As shown in FIG. 6, the packet 640 further removes the label "230-4" from the sequence of labels "230-4" in the packet 630, and thus, only contains the load 611.

As can be seen from the above depiction, the data transmission scheme according to the present disclosure can realize the function-level control of network paths so as to optimize the network performance for different requirements. The scheme classifies data into different traffic types based on the specific function of data and marks data with the mark of an assigned traffic type so that the data can be forwarded along a network path specific to its traffic type. Through dynamic network monitoring and network path generation performed at an integrated controller, the scheme can reflect changes of the network condition. During the data forwarding process, by utilizing label switching technology, the scheme can achieve high-performance forwarding of network packets. In this way, the scheme can achieve function-aware controlling of network paths and provide data transmission services with different service qualities for different users.

Figure 7:
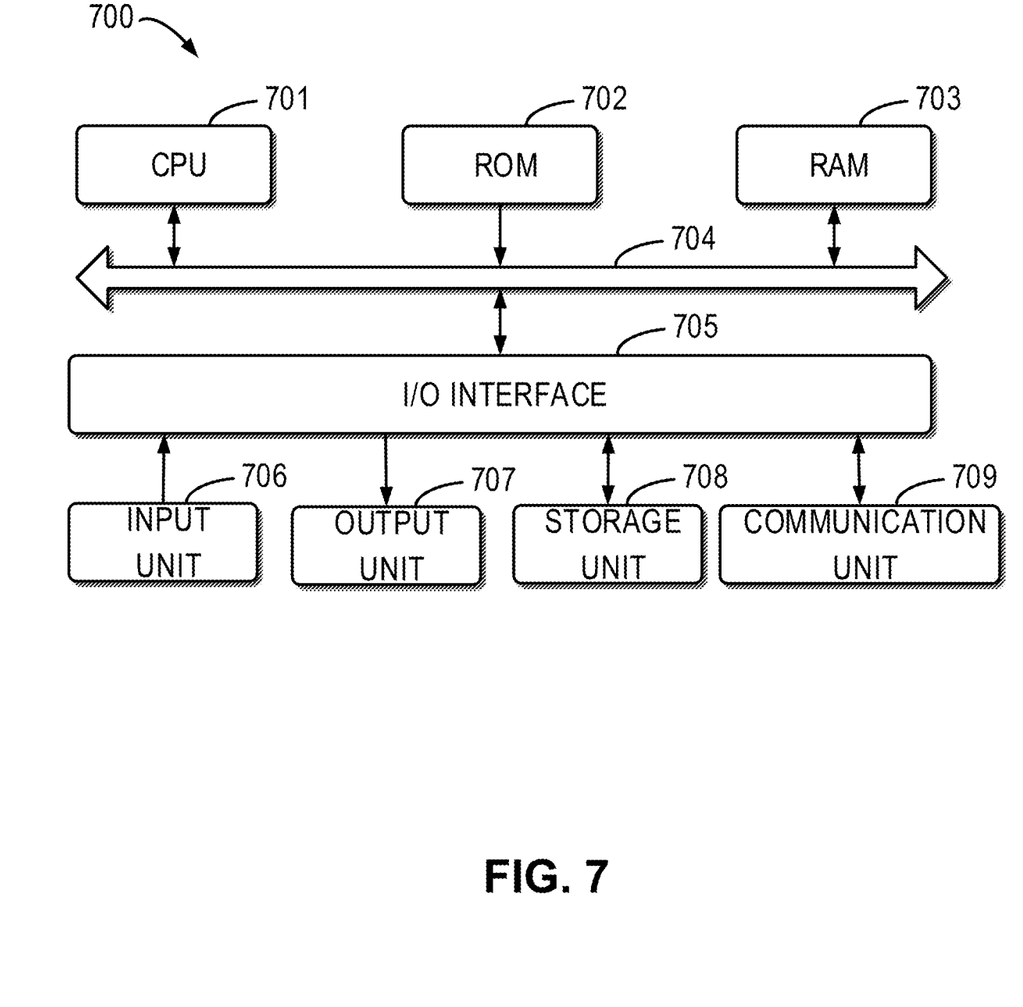
FIG. 7 is a schematic block diagram illustrating an example apparatus that may be used to implement embodiments of the present disclosure.

FIG. 7 is a schematic block diagram of an example apparatus 700 that can be used to implement embodiments of the present disclosure. For example, the client 120, the network nodes 210, 220 or 230 and/or the controller 240 shown in FIG. 2 may be implemented by the apparatus 700. As illustrated, the apparatus 700 includes a central processing unit (CPU) 701 that may perform various appropriate acts and processing based on the computer program instructions stored in a read-only memory (ROM) 702 or the computer program instructions loaded into a random access memory (RAM) 703 from a storage unit 708. The RAM 703 also stores various programs and data needed for operating the apparatus 700. The CPU 701, ROM 702 and RAM 703 are connected to each other via a bus 704 to which an input/output (I/O) interface 705 is also connected.

A plurality of components in the apparatus 700 are connected to the I/O interface 705, including: an input unit 706, such as keyboard, a mouse and the like; an output unit 707, such as various types of displays, loudspeakers and the like; a storage unit 708, such as a disk, an optical disk and the like; and a communication unit 709, such as a network card, a modem, a wireless communication transceiver and the like. The communication unit 709 allows the apparatus 700 to exchange information/data with other apparatus through computer networks such as Internet and/or various telecommunication networks.

Various processes and processing described above, such as the processes 300, 400 and/or 500, may be executed by the processing unit 701. For example, in some embodiments, the processes 300, 400 and/or 500 can be implemented as computer software programs, which are tangibly included on a machine-readable medium, such as the storage unit 708. In some embodiments, the computer program can be partially or completely loaded and/or installed on the apparatus 700 via the ROM 702 and/or the communication unit 709. When the computer program is loaded to the RAM 703 and executed by the CPU 701, one or more steps of the above described processes 300, 400 and/or 500 are implemented.

The present disclosure may be a method, an apparatus, a system and/or a computer program product. The computer program product may include a computer-readable storage medium loaded with computer-readable program instructions thereon for executing various aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, a programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in one or more blocks of the flowchart and/or block diagram. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in one or more blocks of the flowchart and/or block diagram.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in one or more blocks of the flowchart and/or block diagram.

The flowchart and block diagrams in the drawings illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the drawings. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of transmitting data, comprising:
    determining, at a source node, wherein the source node is configured with a central processing unit, a traffic type of a packet to be sent to a destination node, wherein the destination node is configured with a set of application programming interfaces and a set of graphical processing units for virtually providing an accelerated processing capability for the central processing unit of the source node, the source node and the destination node having therebetween a plurality of network paths for different traffic types;

including a mark indicating the traffic type in the packet; and sending the packet including the mark to the destination node such that the packet is forwarded along one of the plurality of network paths specific to the traffic type based in part on a periodically updated look-up table comprising network conditions of different network paths of the plurality of network paths for different traffic types from the source node to the destination node;

wherein determining the traffic type comprises:

determining a given application programming interface for generating the packet; and determining the traffic type based on the given application programming interface.

2. The method according to claim 1, wherein determining the traffic type further comprises:

determining user information related to the packet; and
determining the traffic type based on the user information.

3. The method according to claim 1, wherein including the mark in the packet comprises:

including the mark into any of a service type field in an Internet protocol (IP) header of the packet and a transmission control protocol (TCP) option field in a TCP header of the packet.

4. An apparatus for transmitting data, comprising:

at least one processing unit;

at least one memory coupled to the at least one processing unit and storing instructions executed by the at least one processing unit, the instructions, when executed by the at least one processing unit, causing the apparatus to perform steps of claim 1.

5. A computer program product being tangibly stored on a non-transitory computer readable medium and comprising machine executable instructions which, when executed by a device, cause the device to perform steps of claim 1.

6. A method implemented at a network node, comprising:

in response to receiving, from a source node, wherein the source node is configured with a central processing unit, a packet to be sent to a destination node, wherein the destination node is configured with a set of application programming interfaces and a set of graphical processing units for virtually providing an accelerated processing capability for the central processing unit of the source node, obtaining from the packet a mark indicating a traffic type of the packet;

obtaining a plurality of network paths for different traffic types between the source node and the destination node based in part on a periodically updated look-up table comprising network conditions of different network paths of the plurality of network paths for different traffic types from the source node to the destination node;

selecting, based on the mark, a network path specific to the traffic type from the plurality of network paths; and forwarding the packet according to the selected network path;

wherein the packet is generated from a given application programming interface and the source node is configured to determine the traffic type of the packet based on the given application programming interface.

7. The method according to claim 6, wherein obtaining the mark from the packet comprises:

obtaining the mark from any of a service type field in an Internet protocol (IP) header of the packet and a transmission control protocol (TCP) option field in a TCP header of the packet.

8. The method according to claim 6, wherein obtaining the plurality of network paths comprises:

obtaining the plurality of network paths from a controller managing the network node.

9. The method according to claim 6, wherein the network path specific to the traffic type is represented by a sequence of respective labels mapped to a plurality of network nodes in the network path, and forwarding the packet according to the selected network path comprises:

replacing the mark in the packet using the sequence of labels;

determining a next network node to which the packet is to be forwarded based on the sequence of labels; and forwarding the replaced packet to the next network node.

10. The method according to claim 9, wherein the packet is forwarded among the plurality of network nodes based on a multi-protocol label switching (MPLS) technology.

11. A computer program product being tangibly stored on a non-transitory computer readable medium and comprising machine executable instructions which, when executed by a device, cause the device to perform steps of claim 6.

12. A network node, comprising:

at least one processing unit;

at least one memory coupled to the at least one processing unit and storing instructions executed by the at least one processing unit, the instructions, when executed by the at least one processing unit, causing the network node to perform acts comprising:

in response to receiving, from a source node, wherein the source node is configured with a central processing unit, a packet to be sent to a destination node, wherein the destination node is configured with a set of application programming interfaces and a set of graphical processing units for virtually providing an accelerated processing capability for the central processing unit of the source node, obtaining from the packet a mark indicating a traffic type of the packet;

obtaining a plurality of network paths for different traffic types between the source node and the destination node based in part on a periodically updated look-up table comprising network conditions of different network paths of the plurality of network paths for different traffic types from the source node to the destination node;

selecting, based on the mark, a network path specific to the traffic type from the plurality of network paths; and forwarding the packet according to the selected network path;

wherein the packet is generated from a given application programming interface and the source node is configured to determine the traffic type of the packet based on the given application programming interface.

13. The network node according to claim 12, wherein obtaining the mark from the packet comprises:

obtaining the mark from any of a service type field in an Internet protocol (IP) header of the packet and a transmission control protocol (TCP) option field in a TCP header of the packet.

14. The network node according to claim 12, wherein obtaining the plurality of network paths comprises:

obtaining the plurality of network paths from a controller managing the network node.

15. The network node according to claim 12, wherein the network path specific to the traffic type is represented by a sequence of respective labels mapped to a plurality of network nodes in the network path, and forwarding the packet according to the selected network path comprises:
- replacing the mark in the packet using the sequence of labels;
- determining a next network node to which the packet is to be forwarded based on the sequence of labels; and
- forwarding the replaced packet to the next network node.

16. The network node according to claim 15, wherein the packet is forwarded among the plurality of network nodes based on a multi-protocol label switching (MPLS) technology.

17. An apparatus for transmitting data, comprising:
- at least one processing unit;
- at least one memory coupled to the at least one processing unit and storing instructions executed by the at least one processing unit, the instructions, when executed by the at least one processing unit, causing the apparatus to perform steps of claim 6.

18. The apparatus according to claim 17, wherein obtaining the mark from the packet comprises:
- obtaining the mark from any of a service type field in an Internet protocol (IP) header of the packet and a transmission control protocol (TCP) option field in a TCP header of the packet.

19. The apparatus according to claim 17, wherein obtaining the plurality of network paths comprises:
- obtaining the plurality of network paths from a controller managing the network node.

20. The method according to claim 1, wherein the traffic type comprises at least one of a bandwidth sensitive type, and a latency sensitive type.

* * * * *

UNITED STATES PATENT AND TRADEMARK OFFICE
CERTIFICATE OF CORRECTION

PATENT NO. : 11,336,580 B2
APPLICATION NO. : 16/379308
DATED : May 17, 2022
INVENTOR(S) : Zhi Ying et al.

Page 1 of 1

It is certified that error appears in the above-identified patent and that said Letters Patent is hereby corrected as shown below:

In the Claims

Claim 1, Column 13, Lines 6-10, please delete "a periodically updated look-up table comprising network conditions of different network paths of the plurality of network paths for different traffic types from the source node to the destination node" and insert therefor --a periodically updated look-up table comprising network conditions of the plurality of network paths--

Claim 6, Column 13, Lines 49-53, please delete "a periodically updated look-up table comprising network conditions of different network paths of the plurality of network paths for different traffic types from the source node to the destination node" and insert therefor --a periodically updated look-up table comprising network conditions of the plurality of network paths--

Claim 12, Column 14, Lines 40-44, please delete "a periodically updated look-up table comprising network conditions of different network paths of the plurality of network paths for different traffic types from the source node to the destination node" and insert therefor --a periodically updated look-up table comprising network conditions of the plurality of network paths--

Signed and Sealed this
Fifth Day of July, 2022

Katherine Kelly Vidal
*Director of the United States Patent and Trademark Office*